United States Patent [19]

Engelsmann et al.

[11] 4,283,132
[45] Aug. 11, 1981

[54] PHOTOGRAPHIC CAMERA

[75] Inventors: Dieter Engelsmann, Unterhaching; Peter Lermann, Naring; Reinhard Nicko, Munich; Herbert Schultes, Munich; Karl Wagner, Munich, all of Fed. Rep. of Germany

[73] Assignee: Agfa-Gevaert AG, Leverkusen, Fed. Rep. of Germany

[21] Appl. No.: 116,804

[22] Filed: Jan. 30, 1980

[30] Foreign Application Priority Data

Feb. 7, 1979 [DE] Fed. Rep. of Germany ....... 2904473

[51] Int. Cl.³ .................. G03B 17/00; G03B 17/04
[52] U.S. Cl. .................................. 354/202; 354/187
[58] Field of Search ............... 354/152 VS, 202, 236, 354/219, 193, 195, 199, 221–225, 173, 288, 187

[56] References Cited

U.S. PATENT DOCUMENTS

| 3,260,184 | 7/1966 | Pagel et al. ............................ 354/195 |
| 3,585,916 | 6/1971 | Lange .................................... 354/187 |
| 3,598,031 | 8/1971 | Harvey .................................. 354/149 |
| 3,611,896 | 10/1971 | Aoki ..................................... 354/202 |
| 3,988,752 | 10/1976 | Winkler et al. .................... 354/187 X |
| 4,019,192 | 4/1977 | Miyagawa ............................ 354/187 |

*Primary Examiner*—Donald A. Griffin
*Attorney, Agent, or Firm*—Michael J. Striker

[57] ABSTRACT

A photographic camera has a housing the front wall of which is provided with a view finder having an inlet window and with a lens. A manually slidable first cover is movable to and from a position in which it covers the inlet window, and the second cover is movable to and from a new position in which it covers the lens. An arrangement is provided which links the covers for joint movement so that when the view finder cover moves to a position in which it uncovers the view finder the lens cover automatically also moves to a position to which it uncovers the lens, and vice versa.

13 Claims, 3 Drawing Figures

PHOTOGRAPHIC CAMERA

BACKGROUND OF THE INVENTION

The present invention relates generally to a photographic camera. More particularly,—but not necessarily—the invention relates to a miniature camera.

Stillmore particularly, the invention relates to a photographic camera having a lens (objective) and a separate viewer, as well as covers for protecting the lens and the viewer against damage or contamination when the camera is not in use.

A camera of this general type is known from German Pat. No. 1,170,240. In this camera, the front window or lens of the view finder is rigidly mounted in a film transport slide which can be moved laterally away from the housing and pushed back onto the housing. The film transport slide is provided with a cover located on an extension of the inlet window of the view finder. When the housing and the film transport slide are telescoped together, the cover on the slide is located in front of the lens of the camera, whereas the inlet window of the view finder together with portions of the cover is pushed behind the front wall of the camera which thus itself acts as a protective cover for the inlet window of the view finder. This arrangement is basically satisfactory, but can be used only if the view finder is provided in a slide that can be telescoped relative to the camera housing, and if additionally the axes of the view finder and of the camera lens are located in a plane which is approximately parallel to a camera surface.

A somewhat different proposal has been made in German allowed application A.S. No. 2,338,794 where again a slide is provided which can be telescoped relative to the camera housing. In its telescoped-together position, this slide serves as a cover both for the camera lens and for the inlet window of the view finder. Here, again, the limitation exists that the arrangement disclosed in this reference is suitable only for cameras having a slide that can be telescoped relative to the camera housing and wherein the axes of the camera lens and of the view finder are essentially located in a plane parallel to a camera surface.

SUMMARY OF THE INVENTION

Accordingly, it is a general object of the present invention to overcome the drawbacks of the prior art.

A more particular object of the invention is to provide an improved photographic camera of the type which does not have a slide telescopable with reference to the camera housing but wherein the camera lens and the inlet window of the view finder can be effectively protected despite the fact that the axes of the objective end view finder are not located in a plane substantially parallel to a camera surface.

Still another object of the invention is to provide a camera of the type in question in which both the cover for the view finder and the cover for the lens are movable jointly to positions in which they either cover or uncover the respective associated optical component.

An additional object of the invention is to provide a camera of the type in which this covering (and hence protecting of the optical components against damage and/or contamination by dirt even in the absence of a protective camera back or camera casing) can be effected even if the camera is of the type wherein the camera lens is in a condition of non-use retracted within the camera and must be extended out of the camera to make the camera ready for use.

A concomitant object is to provide a camera of the type mentioned in the just preceding paragraph, in which the same motion which moves the covers to their covering or uncovering positions will also effect movement of the lens to retracted or extended positions.

In pursuance of the above objects, and still others which will become apparent hereafter, one feature of the invention resides in a photographic camera having a combination which, briefly stated, may comprise a housing having a front wall, a view finder having an inlet window at the front wall, and a lens also at the front wall. A manually slidable first cover is movable to and from a first position in which it covers the inlet window of the view finder to protect the inlet window, and a second cover is movable to and from a second position in which it covers the lens to protect the same. Finally, means are provided linking the covers for joint movement to and from the aforementioned positions in response to manual sliding of the first cover to and from the first position of the same.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
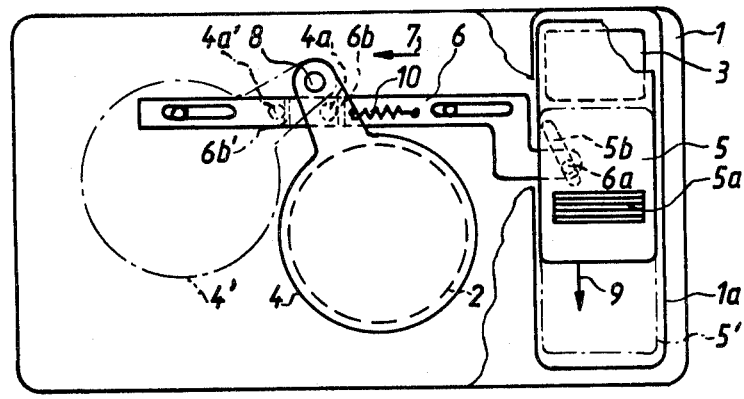
FIG. 1 is a partly broken away front view of a camera incorporating a first embodiment of the invention.

Referring firstly to the embodiment illustrated in FIG. 1 it will be seen that reference numeral 1 identifies the housing of a still camera preferably—but not necessarily, because the invention is not limited thereto—a miniature still camera such as a 35 millimeter camera or a camera using a still smaller film format. The lens and the lens mount therefor is shown diagrammatically and identified with reference numeral 2. Laterally of the lens 2 there is provided an eye level view finder which is located in the upper portion of the housing and the inlet window or front lens 3 of which is shown partially in solid lines and partially in broken lines.

The purpose of the invention is to so construct the camera that it can be readily taken along by a user without requiring it to be encased in a protective camera cover, but without running the risk of damage to or contamination of either the lens 2 or the inlet window 3 of the view finder. This purpose is achieved in providing a (here circular) cover plate 4 which is mounted behind the front wall of the camera housing 1, forwardly of the lens mount 2 which is recessed behind this front wall, so as to be pivotable about a pivot 8 to the full-time position in which it is located in front of the camera lens 2 and protects the same and the chain line position 4' in which it is laterally retracted from the lens 2 and exposes the same for a picture-taking purpose.

In the type of camera in which the axis of the lens and of the view finder are not located in a plane extending approximately parallel to the front wall of the camera, a slidable cover for both the lens 2 and the inlet window 3 of the view finder, extending over the camera front wall, would require too much space and would be relatively expensive to install. For this purpose, the present invention provides the front wall of the camera housing 1 with a depression 1a in which a slidable cover 5 is so arranged that in its one position shown in solid lines it covers the inlet window 3 whereas in its other position shown in chain lines it uncovers the inlet window 3.

The basic purpose of the invention is thus achieved. However, if the two covers 4 and 5 are movable independently of one another there is the danger that a user, placing his finger on the e.g. knurled portion 5a of the cover 5, might displace the same in the direction of the arrow 9 to expose the inlet window 3 of the view finder, but might forget—since he can now look through the view finder—that the lens 2 is still covered by the cover 4. To avoid this problem the cover 5 cannot only slide between the full-line and chain-line positions shown in FIG. 1, but is also constructed as the manually operable control which effects movement of the cover 4 between the full-line and broken-line positions thereof. For this purpose, the inwardly facing surface of cover 5 is provided with a cam groove 5b into which the pin 6a of a slide 6 extends which is shiftable normal to the direction of movement (arrow 9) of the cover 5, i.e. in the direction of the arrow 7 parallel to the plane of the front wall of the housing 1. The cam groove 5b is inclined to the vertical and to the horizontal, i.e. it is inclined both to the direction of movement of the cover 5 and of the slide 6 so that when the cover 5 is moved in the direction of the arrow 9, the slide 6 is pushed away from the cover 5 (to the left in FIG. 1) in the direction of the arrow 7. The slide 6 has a portion 6b which, as considered in the direction of the movement indicated by the arrow 7, is located ahead of a pin 4a of the cover 4. Thus, when the cover 5 is moved to the broken-line position in the direction of the arrow 9, the portion 6b engages the pin 4a and displaces the cover 4 in clockwise direction from the solid-line position to the broken-line position 4'. Thus, the movement of the cover 5 in the direction of the arrow 9 causes both the inlet window 3 and the lens 2 to become exposed by their respective covers. Reverse movement of the cover 5 to the position in which it overlies and protects the front window, allows the cover 4 to return to its solid-line position from the broken-line position 4' under the influence of a spring 10 which is connected between the slide 6 and the cover 4 and which becomes tensioned when the cover 4 originally moves to the position 4', so that subsequently—i.e. when the slide 6 is free again to move towards the right in FIG. 1—it dissipates energy by contracting and thus turning the cover 4 to the solid-line position in which it overlies the lens 2.

It will be understood that instead of the connection illustrated in FIG. 1 between the slide 6 and the cover 4, the cover 4 could be directly formed on the slide 6 as an integral part thereof. The advantage of this would be that the construction would be simpler because fewer parts would be required and there would be a more direct connection between the cover 5 and the cover 4. On the other hand, this would have the disadvantage that in all probability the (now no longer pivotable) cover 4 would have to traverse a greater distance between its positions covering the lens 2 and uncovering the lens 2, respectively.

Figure 2:
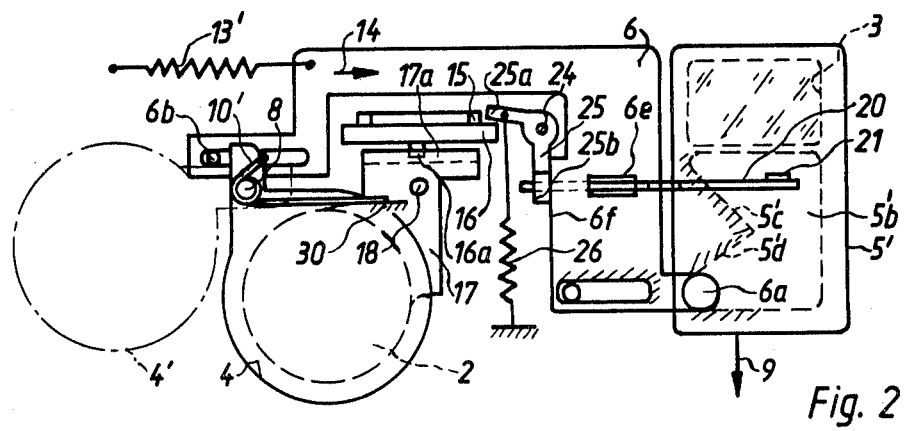
FIG. 2 is a front view analogous to the one in FIG. 1, but with the camera housing omitted, showing a second embodiment of the invention.
Figure 3:
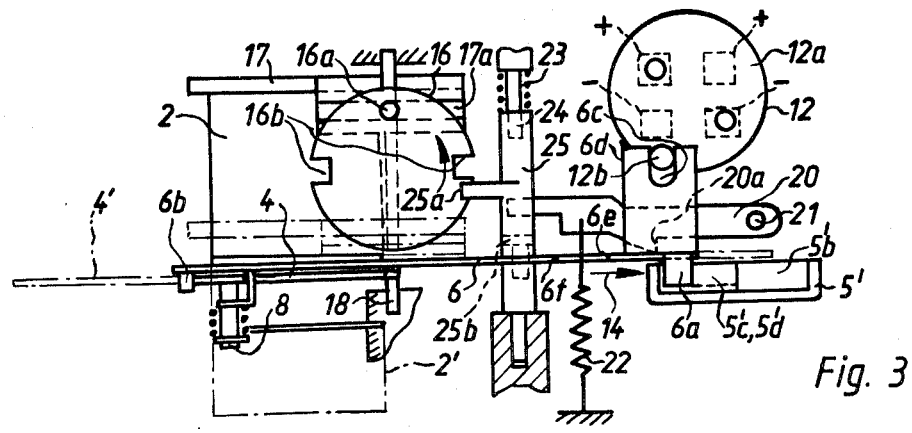
FIG. 3 is a top-plan view of the embodiment in FIG. 2, again with the housing and other components not necessary for an understanding of the invention having been omitted for clarity.

A second embodiment of the invention is illustrated in FIGS. 2 and 3. This differs from the one in FIG. 1 essentially in that the lens 2 is pushed into the camera to the solid-line rest or storage position and for picture-taking purposes must be pulled out of the camera. Such pulling-out from the camera can, of course be effective only after the cover 4 has been moved from its solid-line position to the broken-line position 4'. As in the preceding embodiment, the cover 5' for the view finder inlet window 3 and the cover 4 for the lens 2 are jointly movable between their covering and uncovering positions. However, in the embodiment of FIGS. 2 and 3 the camera may take spoiled pictures even though the inlet window 3 and the lens 2 are both uncovered, namely when despite this uncovering it is forgotten to move the lens 2 from its retracted position to its chain-line operating position (see FIG. 3). Therefore, the embodiment of FIGS. 2 and 3 proposes to automatically effect movement of the lens 2 from its retracted (solid and dashed line) to its extended (chain-line) position in response to movement of the cover 5' between its rest and operating positions.

It is advantageous if all these control movements do not require the user to exert too much energy. According to the invention this is achieved, and a displacement of the lens 2 between its rest and operating positions in automatic response to movement of the cover 5' is assured, by the use of an electric motor 12 which may be reversible so that it can be selectively used in the film-transport mechanism of the camera (not shown) and to effect the movement of the lens between its two positions. For this purpose, a turnable switch 12a is connected with the motor 12 and is shown in FIG. 3 in the position which it assumes when it causes the motor 12 to effect film transport. The polarity of the motor is changed by turning the switch 12a through 90° from the position shown on FIG. 3, so that the motor then effects the movement of the lens 2. The switch 12a has a pin 12b which extends into a slot 6c of a portion 6d of the slide 6, the pin 12b and the slot 6d being so arranged that on movement of the slide 6 from one of its end positions into the other end position the polarity of the motor is changed. In addition, when the polarity of the motor is changed so that the motor can effect movement of the lens between the two positions of the same, the motor is also automatically switched on.

Since the basic functions of the embodiment in FIGS. 2 and 3 correspond to those of FIG. 1, like reference numerals have been used to designate like elements and the function of the elements corresponding to those in FIG. 1 will not again be described. Elements which differ somewhat from those of FIG. 1 have been provided with a prime symbol.

It will be seen in this connection that the slide 5' for the inlet window 3 of the view finder is not provided with the cam groove 5b shown in FIG. 1, but instead is provided with a large cutout 5b which is bounded by two mutually oppositely inclined edges 5'c and 5'd constituting cam tracks against which the pin 6a of the slide 6 rests under the influence of a spring 13'. The cover 4 and the portions 6b are so arranged that when the cover 5' moves in the direction of the arrow 9, the slide 6 moves first in the direction of the arrow 14 (see FIGS. 2 and 3) and the cover 4 is moved to its chain-line withdrawn position 4'. In this position, the slide 6 and the plate 4 are temporarily arrested, in a manner which will be described later on. During further shifting of the cover 5' to the broken-line position in which it expose the inlet window 3, the motor 12 and switch 12a are operated to change the motor polarity and to switch the motor on, and the meanwhile arrested slide 6 is preliminarily released by the cam track 5'c so that later on it can return to its rest or starting position.

A gear train which is known per se and therefore not illustrated, is provided between the motor 12 and the lens 2 respectively the lens mount thereof; this gear train has a one-sided coupling through which a gear 15 is turnable in the counter-clockwise direction. The gear 15 is connected with an eccentric disc 16 having an eccentric pin 16a and being provided in its periphery with two diametrically opposite cutouts or notches 16b which are offset relative to the pins 15a through 90° in each instance. The lens mount for the lens 2 is connected to a carrier plate 17 which is shiftable lengthwise along a shaft 18 extending parallel to the optical axis of the lens 2 and which is provided with a groove 17a extending normal to the axis of the shaft 18. The eccentric pin 16a engages in this groove 17a.

When the motor 12 is activated by the slide 6, the eccentric 16 is turned through 180° and after the plate 4 has been pivoted to the position 4' the lens 2 is now moved from the solid-line retracted position to the chain-line operating position in which it extends from the camera housing 1. The pin 6a and the slot 6c are so dimensioned that the motor 12 and the switch 12a are energized only after the lens 2 has been fully exposed by the cover 4. If the cover 5' is subsequently moved in direction counter to the arrow 9 in order to cover the components 2 and 3, the slide 6 is also moved in the direction 14 by the cam track 5'c and changes the polarity of the motor 12 from the film-transportation mode and switches the motor on. In this instance, also, the eccentric 16 turns counter to the clockwise direction through 180° and via the pin 16a and plate 17 pushes the lens back into the camera housing to the solid-line position.

As previously mentioned, the slide 6 is temporarily arrested in its end position to which it moves in the direction of the arrow 14, the purpose being to prevent the slide 6 from releasing the switch 12a for movement out of its polarity reversing closed position despite the preliminary release of the slide 6 by the respective cam track 5'c or 5'd. The switch 12a must be maintained in its closed position until the lens 2 has been fully extracted from the camera to the chain-line position, or else has been fully retracted into the camera to the solid-line position. To effect this arresting the slide 6 has an upstanding portion 6e which is engaged in the rest position of the slide 6 by the nose 20a of the arm 20 pivotable about the axis 21. The arm 20 is under the influence of a spring 22 which pulls it towards the projection 6e so that the nose 20a drops behind the projection 6e when the slide 6 has reached its end position during movement in the direction of the direction of the arrow 14. A lever 25 is provided, which is shiftable on a shaft 24 under the influence of a spring 23, and which has two lever arms 25a and 25b of which the arm 25a is pulled under the influence of a spring 26 against the surface of the eccentric disc 16 respectively the cutouts or notches 16b thereof.

When the eccentric disc 16 is turned through approximately 180°, i.e. after an objective-extending or retracting movement, the lever arm 25a drops into that one of the notches 16b which just happens to be moving past the axis of the shaft 24 counter to the influence of the spring 23. The lever arm 25b takes along the lever 20 in clockwise direction during this movement, so that the nose 20a of the lever 20 is disengaged from the projection 6e, releasing the slide 6 for return to its rest position counter to the direction of the arrow 14, which movement it can perform under the influence of the previously stressed spring 13'. During this movement, it takes along the switch 12a in clockwise direction to the open position of the same that is shown in FIG. 3. Towards the end of its return movement the slide 6 engages with its edge 6f against the lever arm 25b of the lever 25 and turns the lever in clockwise direction to the position illustrated in FIG. 2. During this movement the lever arm 25a moves out of engagement with the notch 16b and is pushed back under the influence of the spring 23 until it assumes the position shown in FIG. 3 so that it again becomes located above the eccentric disc 16 as shown in FIG. 2. During the next actuation of the cover 5 the slide 6 is then again released by the edge 6f for engagement with the eccentric disc 16, or more particularly for snapping into one of the notches 16b thereof.

When the slide 6 moves back to its starting position counter to the direction of the arrow 14 after having been released by the lever 20, the slide 6, 6b towards the end of its movement releases the plate to the cover 4 so that it can return from the position 4' or solid-line position in which it covers the lens 2. If in the return movement of the slide 6 the lens 2 has moved to the projecting chain-line position shown in FIG. 3 due to the uncovery of the inlet window 3 by appropriate movement of the cover 5, then the cover 4 simply abuts against the objective mount of the lens 2 and is held by the same in open position. The view finder with its inlet window 3 and the lens 2 are now in picture-taking position. If, however, the slide 6 returns to its starting position after the cover 5' has been moved to the position in which its covers the inlet window 3, then the objective 2 will have been retracted into the camera by the time the cover 4 is released for movement to its solid-line position, and will therefore return from the position 4' to the solid-line position under the influence of the spring, pivoting in front of the lens 2 and covering the same. An abutment 30 is provided on the housing to determine the closed or lens-covering position of the cover 4.

Various modifications may be made without departing from the scope and intent of the present invention. For example, the movement of the lens 2 in FIGS. 2 and 3 could be effected by an electric motor having only one direction of rotation, and the motor could be energized when the slide 6 has come to rest after moving in the direction of the arrow 14, assuming that the motor is not additionally to perform the film-transporting function. Again, the motor drive for moving of the lens 2 could be replaced with a mechanical drive coupled between the cover 5' and the lens 2, for example in the form of a crank rod between the slide 6 and the eccentric disc 16. The cover 5' need not be vertically movable as indicated by the arrow 9, but could also instead be horizontally movable in the direction of the arrow 7, in which case the slide 6 controlling the movement of the cover 4 could in turn be controlled by and follow the movements of the cover 5'.

It will be appreciated that all embodiments of the invention have in common that the cover 5 or 5' for the inlet window 3 of the view finder serves also as the operating member or handle which controls not only the movement of the cover 5 or 5' but also controls the movement of the cover 4 at the same time, and which in the embodiment of FIGS. 2 and 3 also controls the movement of the lens 2 between the retracted and extended positions of the same. Thus, it is assured that all of these components are simultaneously moved to or exposed for operational readiness so that exposed pictures are avoided, whereas when the camera is to be taken out of service at any given time all of the components are simultaneously moved to their rest positions respectively covered (for the view finder and the lens) so as to protect them against damage (e.g. scratches) and/or dirt or other contaminants.

While the invention has been illustrated and described as embodied in a miniature camera, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic camera, particularly a miniature camera, a combination comprising a housing having a front wall; a view finder having an inlet window at said front wall; a lens also at said front wall; a manually slidable first cover movable to and from a first position in which it covers said inlet window to protect the same, said first cover including a cam; a second cover movable to and from a second position in which it covers said lens to protect the same; and means linking said covers for joint movement to and from said positions in response to manual sliding of said first cover to and from said first position thereof, said means including a slide cooperating with and tracking said cam and being operatively connected with said second cover.

2. A combination as defined in claim 1, wherein said inlet window is located in a recess of a margin of said front wall, and said lens is located substantially centrally of said front wall.

3. A combination as defined in claim 1, said front wall having another side facing outwardly of the housing and an inner side facing inwardly of the housing; and wherein said lens is rearwardly spaced from said inner side and said second cover is movable intermediate said lens and said inner side.

4. A combination as defined in claim 3, said lens being mounted for sliding movement between a rest position in which it is rearwardly spaced from said inner side and an operating position in which it extends through said front wall and forwardly of said outer side; and wherein said means further includes a linkage operative for moving said lens to said operating position in response to but only on completion of the movement of said second cover from said second position, and vice versa.

5. In a photographic camera, particularly a miniature camera, a combination comprising a housing having a front wall; a view finder having an inlet window at said front wall; a lens also at said front wall; a first cover slidable to and from a position in which it covers said inlet window to protect the same; a substantially disk-shaped second cover pivotally mounted adjacent to said lens for movement to and from a second position in which it covers said lens to protect the same; and cooperating engaging portions on said first and second covers and linking the same for joint movement to and from said positions in response to sliding of said first cover to and from said first position thereof.

6. A combination as defined in claim 5, said linkage including an electric motor and a gear train connecting said motor with said lens to effect movement thereof between said rest and operating positions; and further comprising motor energizing and de-energizing switch means located in the path of movement of and actuated by said slide.

7. A combination as defined in claim 6, said motor being a reversible motor normally serving to transport film in the camera; and said switch means being operable for switching said motor from a film-transporting mode to a lens-moving mode thereof.

8. A combination as defined in claim 6, said switch means comprising a rotary switch coupled with said slide.

9. A combination as defined in claim 8, said lever being shiftable by said turnable member on entry of said one arm into the respective notch; and further comprising a detecting member located in the path of shifting of said lever and disengagable from said slide when the latter moves in said one direction.

10. A combination as defined in claim 9, said cam being formed by two mutually oppositely inclined edges of a cut-out in said first cover.

11. A combination as defined in claim 6, said lens having a movable support formed with a groove extending normal to the optical axis of the lens; and said gear train including a turnable member having an eccentric pin engaging in said groove and moving said lens alternately from said rest position to said operating position and vice versa during successive half-revolutions of said members.

12. A combination as defined in claim 11, said turnable member being a disk having a periphery provided with diametrically opposite notches; further comprising a double-armed lever turnably mounted adjacent said disk and being subject to spring bias so that one of the lever arms permanently tends to enter that one of the notches which is located opposite it, said slide releasing said one arm for entry into the respective notch when moving in one direction and disengaging said one arm from the respective notch when moving in a direction opposite to said one direction.

13. In a photographic camera, particularly a miniature camera, a combination comprising a housing having a front wall; a view finder having an inlet window at said front wall; a lens also at said front wall; a first cover slidable in a first direction to and from a position in which it covers said inlet window to protect the same; a second cover movable in a second direction transverse to said first direction to and from a position in which it covers said lens to protect the same; and cooperating engaging portions on said first and second covers and linking the same for joint movement in response to sliding of said first cover to and from said first position thereof.

* * * * *